Figure 1:
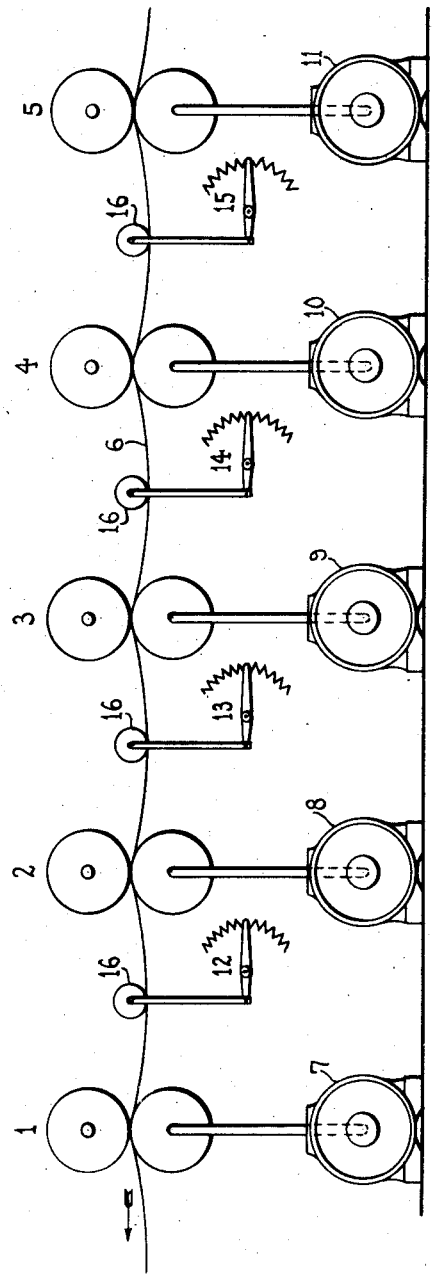

June 24, 1930.   N. L. MORTENSEN   1,767,606
CONTROLLER FOR ELECTRIC MOTOR DRIVEN MACHINERY
Filed March 28, 1925   3 Sheets-Sheet 1

INVENTOR.
Niels L. Mortensen
BY
ATTORNEY.

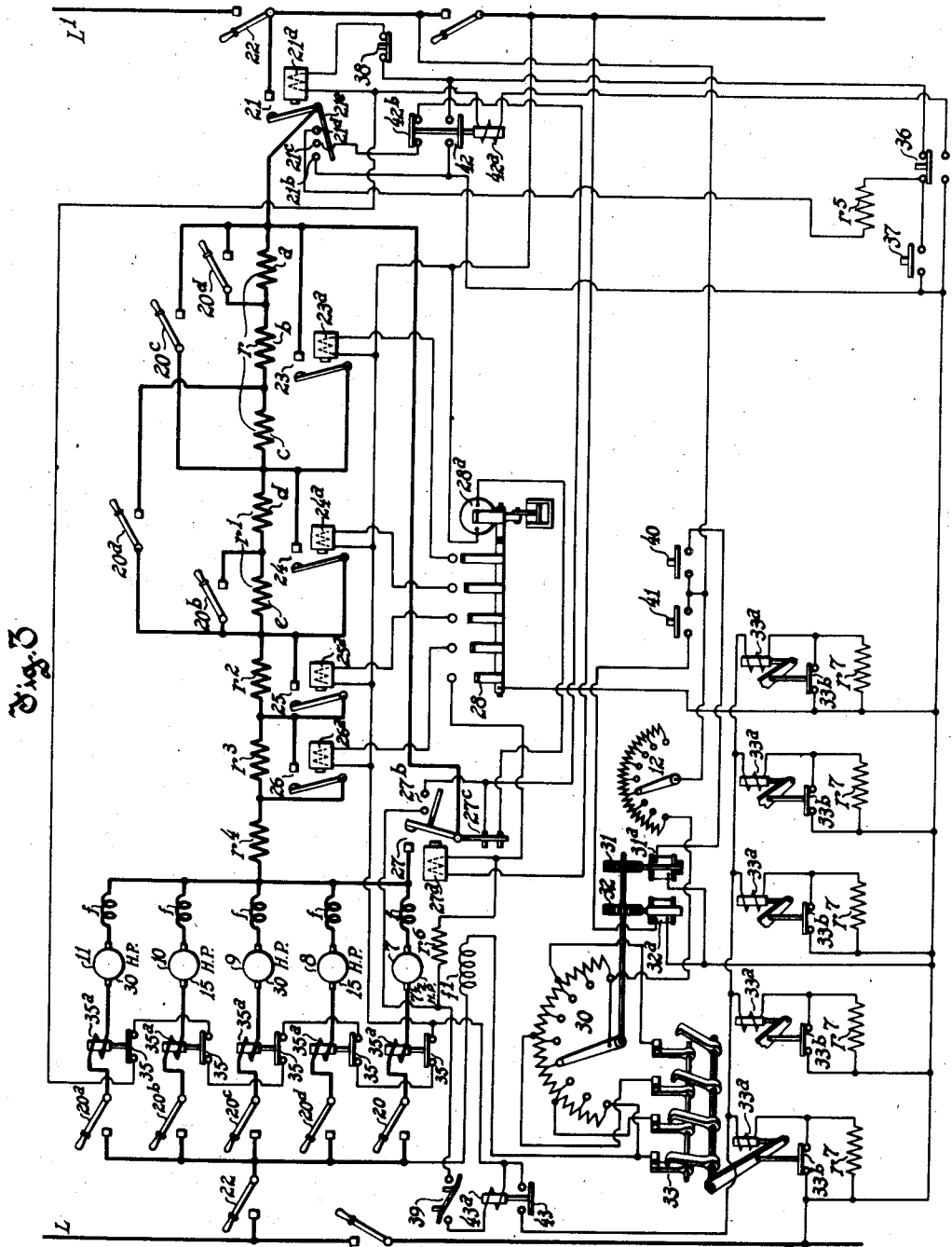

Patented June 24, 1930

1,767,606

UNITED STATES PATENT OFFICE

NIELS L. MORTENSEN, OF MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

CONTROLLER FOR ELECTRIC MOTOR-DRIVEN MACHINERY

Application filed March 28, 1925. Serial No. 19,014.

This invention relates to controllers for electric motor driven machinery.

More particularly, the invention relates to controllers for machinery comprising a plurality of sections having individual driving motors, as, for example, a cloth finishing plant comprising a dyeing machine, drying cans, water and starch mangles, other drying cans and a tenter frame, all separately driven and through which material must be passed in the order named.

The various objects and advantages of the invention will be best understood upon consideration of the embodiment thereof which is hereinafter disclosed.

The accompanying drawings illustrate an embodiment of the invention particularly applicable to cloth finishing machines, although not limited thereto.

Figure 2:
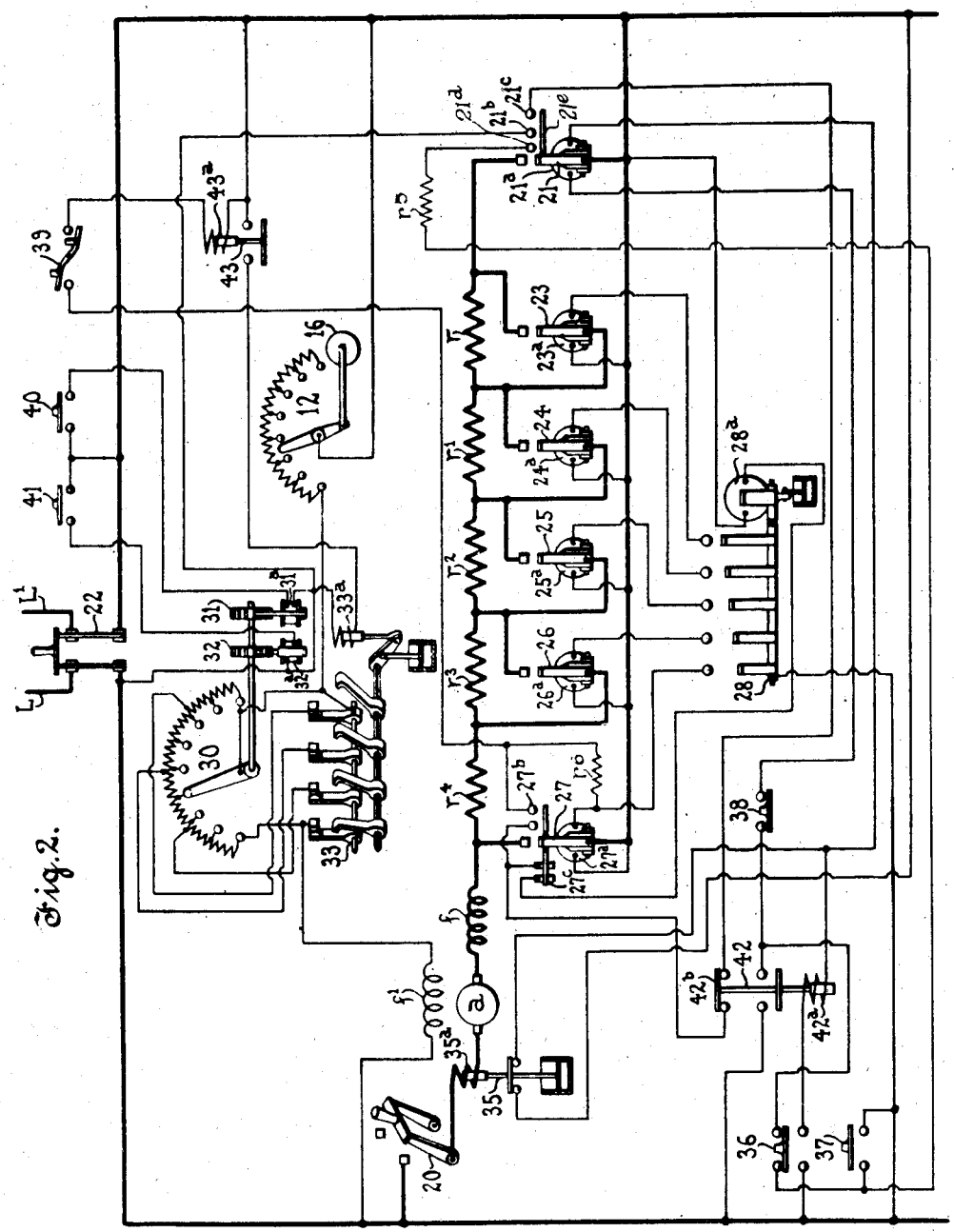

In the drawings,

Figure 1 is a diagrammatic view wherein the several machines are for simplicity illustrated as comprising a pair of rollers;

Fig. 2 is a diagrammatic view illustrating the control elements preferably provided for each of the several driving motors, although, as will appear, certain of such elements may be made common to a plurality of motors; and, Fig. 3 is a so-called across-the-line diagram illustrating the several motors and exemplifying the control of all of the same through the medium of control instrumentalities such as shown in Fig. 2.

More specifically describing Fig. 1, the same illustrates pairs of rollers 1 to 5 through which a web of material 6 is passed in series from right to left as indicated by the arrow. The pairs of rollers 1, 2, 3, 4 and 5 are respectively provided with driving motors 7, 8, 9, 10 and 11, which may have the same or different horse power ratings. The controller to be hereinafter described is particularly designed for a plant wherein the motor 11 operating the dyeing machine has a 30 h. p. rating; the motors 10 and 8 operating the drying cans have a 15 h. p. rating, the motor 9 operating the water and starch mangle has a 30 h. p. rating, and the motor 7 operating the tenter frame has a 7.5 h. p. rating. As will be understood the motor 7 is the lead motor, and the remaining motors, or such of the same as are used, must be started and accelerated in unison with the lead motor and must be thereafter maintained at substantially the same speed as that of the lead motor. To this end the motors 8, 9, 10 and 11 are provided with suitable speed regulators 12, 13, 14 and 15, respectively, each of which has operating means including a dancer roll 16 bearing upon the web 6 between adjacent machines. Also, as will be understood it may be desired to silence certain of the machines from time to time while operating others, always inclusive of the lead machine, and, as will appear, the controller hereinafter described provides therefor.

Referring to Fig. 2, the same illustrates one of the motors as comprising an armature $a$, a series field $f$ and a shunt field $f'$, all of the motors being preferably of the same type. Also, this figure shows control means for the motor including a knife switch 20 and an electro-responsive switch 21 for connecting the motor armature and series field across supply lines L and $L^1$, a double pole knife switch 22 being interposed between the motor and the line and the shunt field winding of the motor being connected across the supply lines by said knife switch 22. The controller also includes sections of resistance $r$ to $r^4$ in series with the motor armature and electro-responsive switches 23, 24, 25, 26 and 27 to short circuit said resistance sections respectively, said switches being controlled by an electro-responsive multi-contact device 28 for energization thereby in the order stated. Further, the controller comprises a rheostat 30 for the shunt field circuit of the motor, said rheostat having electromagnetically controlled ratcheting devices 31 and 32 whereby it may be adjusted at will, and having an electro-responsive control device 33 of the multi-contact type whereby the resistance of said rheostat may be automatically included in circuit to a varying degree according to the setting of said rheostat. As previously set forth, each of the motors 8 to 11 is provided with a rheostat, 12 to 15 respectively, operated by a dancer roll, and such a rheostat is shown in Fig. 2 in a series relation with the motor shunt field.

The aforedescribed control elements are so coordinated as to provide for starting of the motor with full field strength upon closure of knife switch 20 and main switch 21, except as the field strength of the motor may be effected by rheostat 12, and in starting all of the resistance sections $r$ to $r^4$ are included in series with the motor. Thus, provision is made for slow speed operation of the motor for inching or threading whereas running speed is obtained by energizing the multi-contact device 28. This provides for energization of the switches 23 to 27 sequentially to exclude the armature resistance in a step by step manner, after, which the multi-contact device 33 may be energized to include the resistance of the rheostat 30 in the shunt field circuit in a step by step manner and to an amount governed by the setting of the rheostat arm.

Further considering the controller shown in Fig. 2, the same comprises an overload switch 35 controlling the circuit of the main switch 21, push button control switches 36, 37, 38, 39, 40 and 41 and electro-responsive relays 42 and 43, said relays being respectively controlled by certain of said push button switches. While most of the circuits of the instrumentalities heretofore described are shown in Fig. 2, certain circuits have been omitted for simplicity, such omitted circuits as well as all those illustrated having been shown in a more obvious manner in Fig. 3.

Before considering Fig. 3 it may be mentioned that the push button switch 36 is the "inch" switch and when depressed effects response of the relay 42 which in turn energizes the main switch 21 to start the motor for slow speed operation. The slow speed operation continues as long as switch 36 is held depressed, and when said switch is released it deenergizes the relay 42 which in turn deenergizes the main switch 21 to stop the motor. Push button switch 37 is the "run" switch and when depressed energizes the main switch 21 to start the motor and said main switch upon responding establishes a maintaining circuit for itself, and, at the same time, effects response of the multi-finger device 28 to energize the switches 23 to 27 in sequence to accelerate the motor by exclusion of the armature resistance. Then, if push button 39, which is the "fast" switch, is closed the same energizes relay 43 to effect response of the multi-finger device 33 for further acceleration of the motor by inclusion of field resistance as above set forth. Push buttons 40 and 41, respectively, control the energizing circuits of the ratcheting devices 31 and 32, whereby the field rheostat 30 may be adjusted at will for subsequent speed regulation or for pre-setting purposes. Push button switch 38, which is the "stop" switch, may be depressed at any time to effect stopping of the motor, depression of said button effecting deenergization of the main switch 21 and consequent deenergization of all resistance controlling switches.

Referring now to Fig. 3, it will be observed that depression of "inch" switch 36 connects the winding 42$^a$ of relay 42 directly across lines L and L$^1$ through the overload relays 35, and upon response of relay 42 its contacts designated by this numeral complete circuit from line L through the "stop" switch 38 to and through the winding 21$^a$ of the main switch 21, thence to and through the overload relays 35 to line L$^1$. On the other hand, assuming switch 36 to be in the position illustrated, depression of "run" switch 37 completes circuit from line L to and through said switch 37, and through "inch" switch 36 and "stop" switch 38 to the winding 21$^a$ of the main switch 21, said winding being connected to line L$^1$ through the normally closed contacts of overload relays 35. The main switch upon responding completes through its contacts 21$^b$, 21$^e$ and 21$^d$ a circuit from line L through a resistance $r^5$ and push button switches 36 and 38 to the winding of said main switch whereby the latter is maintained energized upon release of "run" switch 37. Also the main switch through its auxiliary contacts 21$^b$, 21$^e$ and 21$^c$ completes circuit from line L through normally closed contacts 42$^b$ of the "inch" relay 42 and through normally closed auxiliary contacts 27$^c$ of accelerating switch 27 to one terminal of the operating winding 28$^a$ of the multi-contact device 28, the opposite terminal of said winding being connected to line L$^1$. Response of device 28 connects the windings 23$^a$, 24$^a$, 25$^a$, 26$^a$ and 27$^a$ in sequence across lines L and L$^1$, each of said windings having one terminal connected to line L$^1$ and its opposite terminal connected to one of the contacts of device 28, the co-operating contact of device 28 being connected to line L. Switch 27 upon responding to cut out the last step of armature resistance disengages its auxiliary contacts 27$^c$ with the result of deenergizing the device 28, and hence deenergizing windings 23ᵃ, 24ᵃ, 25ᵃ and 26ᵃ. Deenergization of device 28 also tends to deenergize winding 27ᵃ, but switch 27 through its auxiliary contacts 27ᵇ establishes a maintaining circuit which extends from line L through contacts 21ᵇ, 21ᵉ and 21ᶜ of the main switch 21 and normally closed contacts 42ᵇ of the "inch" relay and a protecting resistance $r^6$ to winding 27ᵃ. Closure of "fast" switch 39 completes circuit from line L through the auxiliary contacts just mentioned to and through said switch 39 to the winding 43ᵃ of the relay 43, the opposite terminal of said winding being connected to line $L^1$. This provides for energization of relay 43 which through its contacts designated by this numeral completes circuit from line L through the operating winding 33ᵃ of one of the multi-finger field control devices 33 to line $L^1$. Push button switches 40 and 41 provide for connection of the ratcheting windings 31ᵃ and 32ᵃ directly across lines L and $L^1$.

Fig. 3 further shows the armatures and series field windings of all five motors of Fig. 1 but for simplicity only one shunt field winding is illustrated. Assuming each of the motors to have a shunt field winding, the shunt field circuit of each would be provided with a rheostat 12, a rheostat 30, and a control device 33 for the latter rheostat, although for simplicity only one set of such instrumentalities is shown. Also this figure shows each motor as provided with a knife switch 20, as in Fig. 2, to connect the same to line L through one blade of knife switch 22. For convenience the switches 20 for motors 11, 10, 9 and 8 are designated as 20ᵃ, 20ᵇ, 20ᶜ and 20ᵈ, respectively, and the blades of knife switch 22 are separated for convenience of illustration. Further, each motor is shown as provided with an associated overload relay coil 35ᵃ connected with respect thereto as illustrated in Fig. 2, said motors being connected in parallel for control through the medium of the same armature resistance and accelerating switches. The armature resistances are divided into five sections, as in Fig. 2, certain of the sections being sub-divided for a purpose to be hereinafter set forth.

More particularly describing the sub-division of resistances, the resistance $r$ is sub-divided into three sections $a$, $b$ and $c$, while the resistance $r'$ is sub-divided into two sections $d$ and $e$. When all motors are to be started, then a given starting resistance should be included in circuit subject to exclusion in steps as heretofore described. On the other hand, when it is desired to start certain of the motors, others being silent, it is necessary to adjust the starting resistance accordingly, and it is for this purpose that the steps of resistance are sub-divided as described, means being provided to short-circuit different amounts of resistance according to the selection of motors to be started. More particularly, knife switch 20ᵃ of motor 11 has associated therewith a second blade (Fig. 2) to short-circuit section $c$ of resistance $r$ and sections $d$ and $e$ of resistance $r'$; knife switch 20ᵇ of motor 10 has a second blade to short-circuit section $e$ of resistance $r'$; knife switch 20ᶜ of motor 9 has a second blade to short-circuit all three sections of resistance $r$ and knife switch 20ᵈ of motor 8 has a second blade to short-circuit section $a$ of resistance $r$. As will be understood, the switches 20 are so designed that each upon closure sets its second blade to effect the resistance commutation aforedescribed, and, as will also be understood, the resistance commutations may be varied for motors of different capacities. Thus provision is made whereby all of the motors or any selected group thereof inclusive of motor 7 may be started and brought up to normal speed through the medium of a common set of accelerating switches, the resistance being suitably commutated according to the grouping of said motors.

Likewise provision is made whereby all motors or any group thereof inclusive of motor 7 may be further accelerated through the medium of common control instrumentalities. As shown in Fig. 3, the relay 43 controls a plurality of five windings 33ᵃ connected in parallel, said windings being provided to control a field rheostat 30 for each of the motors as above described. Thus, whenever the relay 43 is energized by closure of "fast" switch 39 the field controlling devices of all of the motors will be caused to operate, and if the field rheostats 30 are correspondingly set the motors will be correspondingly accelerated. Also, as will be apparent, the ratcheting devices 31 and 32 of Fig. 2 may be utilized to adjust all of the rheostats 30 through the medium of a shaft common to said rheostats, and such an arrangement will insure maintaining a given relation between said rheostats for field control purposes, whereas the field rheostats operated by the dancer rolls of Fig. 1 will tend to maintain the desired speed relation of the several motors in the event of varying conditions tending to vary the speed of any individual motor.

Each winding 33ᵃ (Fig. 3) is shown as provided with a protecting resistance $r^7$ normally short-circuited by contacts 33ᵇ adapted to be opened by response of the corresponding field controlling device 33. Thus provision is made for maintaining the several devices energized without over-heating of windings 33ᵃ.

As aforedescribed each motor has an associated overload relay 35, the contacts of which are in series between the winding 21ᵃ of main switch 21 and line $L^1$. Thus it will be apparent that response of any one of said overloads will effect disconnection from circuit of all motors.

What I claim as new and desire to secure by Letters Patent is:

1. In a controller for a plurality of motors to be connected across the line in a parallel relation, in combination, starting means for the motors including common resistance, switches for certain of the motors to disconnect each from circuit independently of the remaining motors, and means associated with certain of said switches to vary the effective amount of said resistance according to the number of motors connected in parallel.

2. In combination a lead motor, other motors to be connected in parallel therewith, switches for the latter motors whereby each may be included in circuit with the remaining motors or disconnected therefrom at will, common starting means for said motors including armature resistance and commutating means for said resistance controlled by said switches to provide an effective resistance appropriate for the total power capacity of the active motors.

3. In a controller for a plurality of motors, certain of which have different horse power ratings, in combination, means to establish parallel connections for said motors, said means including switches to disconnect certain of the motors selectively, resistance to be included in a common circuit of the motors, and means associated with said switches to vary the effective amount of said resistance according to the total horse power capacity of the active motors.

4. In a controller for a plurality of motors, in combination, means to connect the motors in circuit in a parallel relation, said means including switches to disconnect certain of the motors selectively, common resistance for the motors, means to remove said resistance in steps, and means associated with said disconnecting switches to vary the effective amount of said resistance according to the total power capacity of the active motors while preserving the number of steps in which the resistance is excluded by said second mentioned means.

5. In a controller for a plurality of motors, in combination, switches whereby the motors may be connected in a parallel relation or disconnected selectively, armature resistance for the motors, means associated with said switches to vary the effective amount of said resistance according to the total power capacity of the active motors, and means for effecting operation of the connected motors, said means including means whereby the motors may be optionally operated at slow speed with said resistance included in circuit or at normal speed with said resistance excluded from circuit.

6. In a controller for a plurality of motors each having a shunt field winding, in combination, a separate field rheostat for each motor, means to jointly effect like settings of all of said field rheostats and means to effect inclusion substantially simultaneously of the resistances of all of said rheostats in amounts determined by the settings of said rheostats.

7. In a controller for a plurality of motors each having a shunt field winding, in combination, separate field rheostats for the several motors, separate devices for normally excluding from circuit said field rheostats, said devices having common control means and acting in response thereto to include the resistances of all of said rheostats simultaneously in a step by step manner, and means for adjusting said rheostats in unison to vary the effectiveness of said devices.

8. The combination with a plurality of motors having common starting resistance, of means for starting the motors in unison, said means including separately operable switches whereby certain of said motors may be disconnected from circuit, each of said switches when so operated being also adapted to simultaneously and definitely vary the value of said starting resistance accordingly, and automatically operable control means tending to maintain a constant speed relation of all active motors.

9. The combination with a plurality of motors each having a shunt field winding, of means for starting said motors in unison, said means providing for parallel connection of said motors and comprising armature resistance common to said motors and means to disconnect certain of said motors selectively, said last mentioned means also providing for definite variation of the effective amount of said resistance according to the selection of active motors, and individual field control devices for certain of said motors functioning to maintain a constant speed relation of the active motors.

10. The combination with a plurality of motors each having a shunt field winding, of means for starting said motors in unison, said means providing for parallel connection of said motors and comprising armature resistance common to said motors and means to disconnect certain of said motors selectively, said last mentioned means also providing for definite variation of the effective amount of said resistance according to the selection of active motors, individual field control devices for certain of said motors tending to maintain a given speed relation of the active motors, and means independent of said devices for jointly effecting field weakening of all motors for acceleration of the active motors in unison.

11. The combination with a plurality of motors having common starting resistance, of means for starting the motors in unison, said means providing for parallel connection of said motors and comprising separately operable switches to disconnect certain of said motors selectively, said switches also acting at the same time to definitely vary the starting resistance accordingly, and separate protective devices for said motors, each adapted to respond to abnormal conditions in its respective motor circuit to effect disconnection of all of said motors.

In witness whereof, I have hereunto subscribed my name.

NIELS L. MORTENSEN.